W. ROBINSON.
BICYCLE.
APPLICATION FILED OCT. 8, 1897.
1,067,230.
Patented July 8, 1913.
4 SHEETS—SHEET 1.
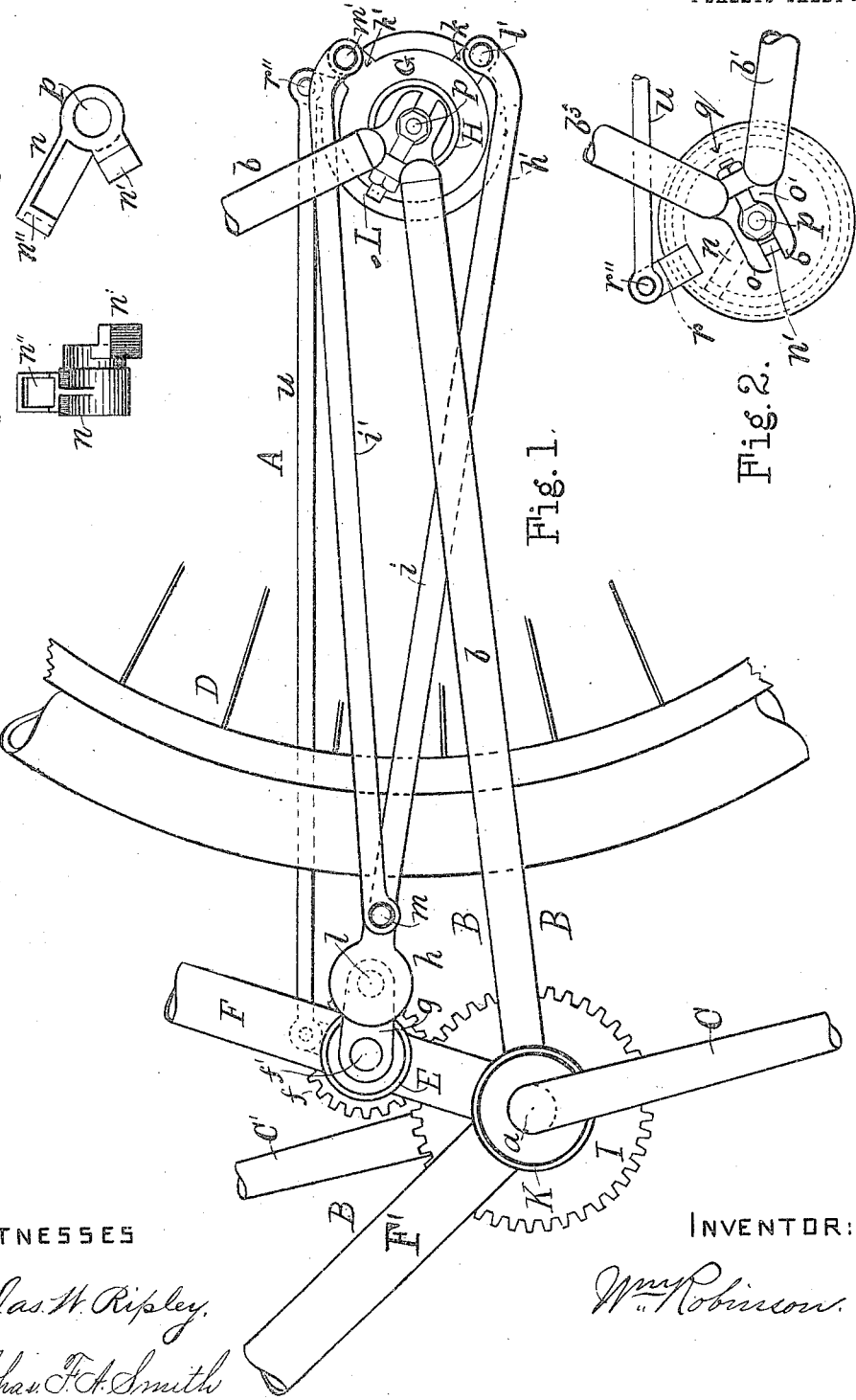
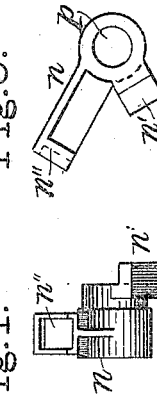
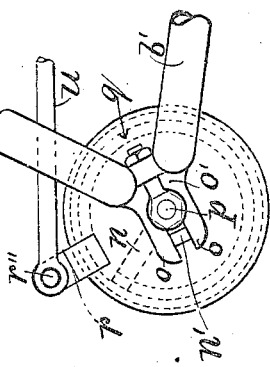
WITNESSES
Jas. W. Ripley.
Chas. F. A. Smith
INVENTOR:
Wm. Robinson.

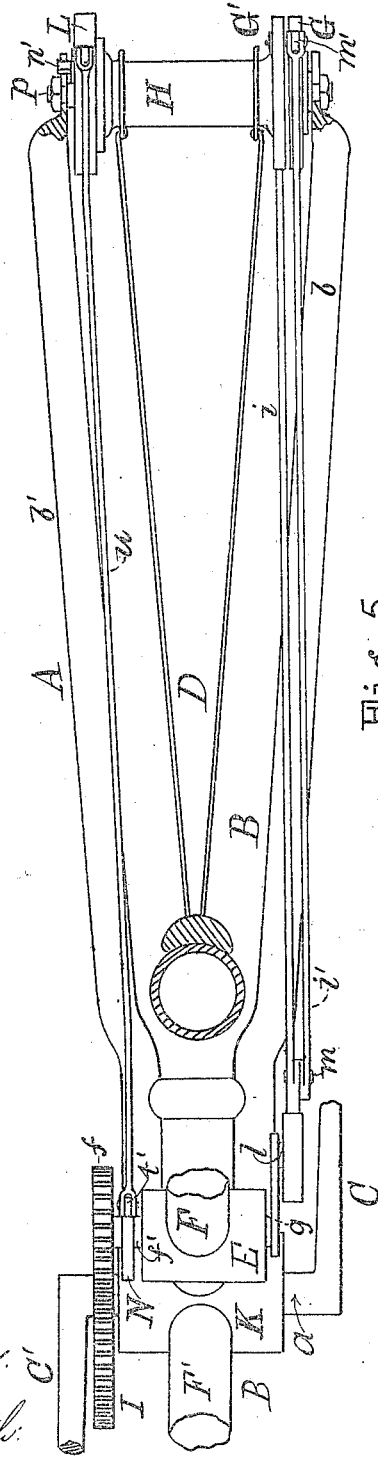

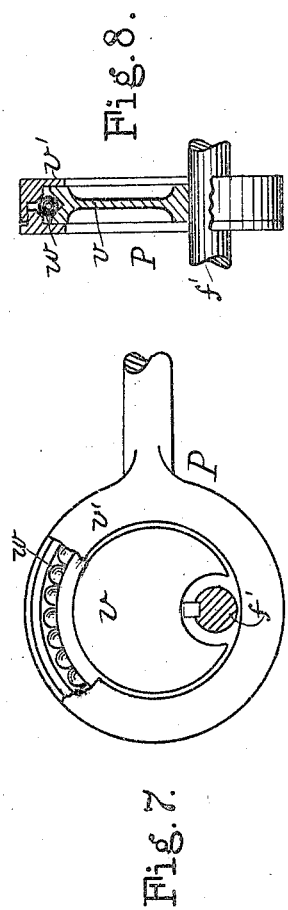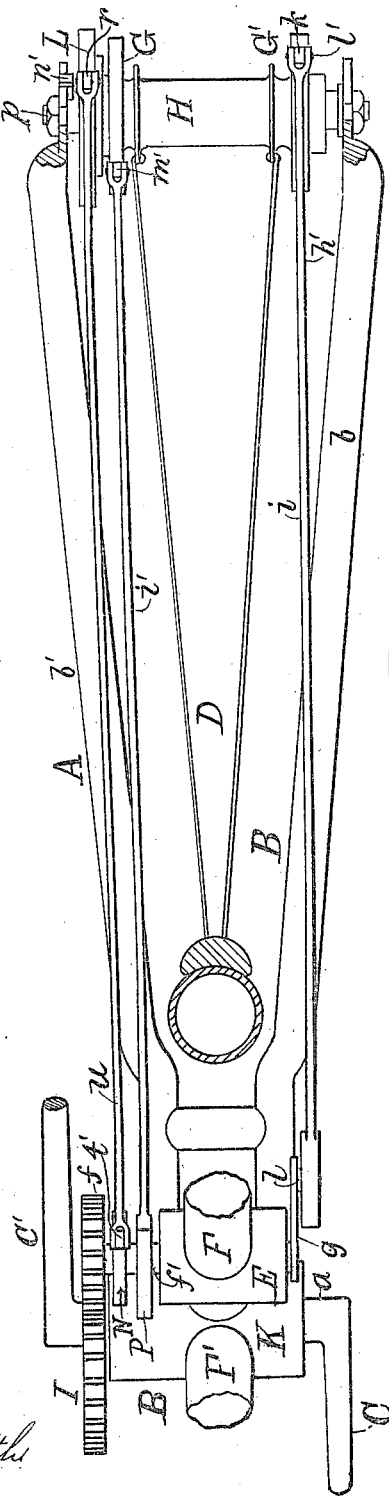

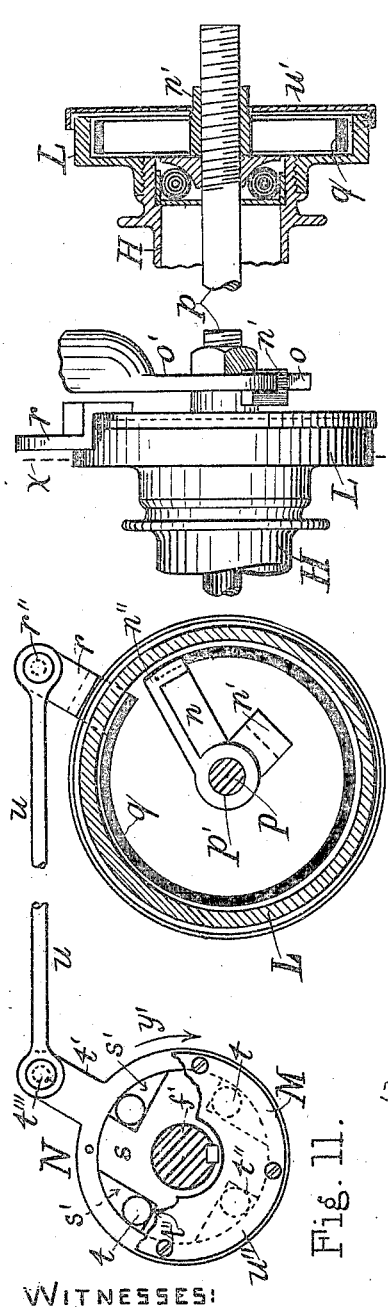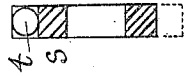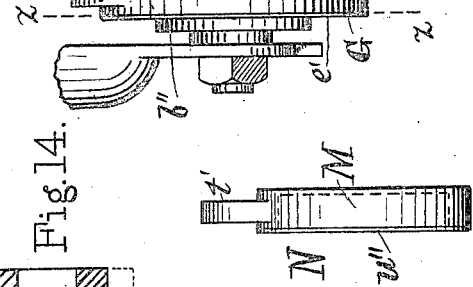

UNITED STATES PATENT OFFICE.

WILLIAM ROBINSON, OF BOSTON, MASSACHUSETTS.

BICYCLE.

1,067,230.

Specification of Letters Patent.     Patented July 8, 1913.

Application filed October 8, 1897. Serial No. 654,532.

*To all whom it may concern:*

Be it known that I, WILLIAM ROBINSON, a citizen of the United States, residing at Boston, in the county of Suffolk and State of Massachusetts, have invented a new and Improved Bicycle, of which the following is a specification.

My invention includes means for driving the machine without the intervention of a chain.

It also embodies an automatic brake mechanism.

The nature of my invention will be clearly understood from the description which follows, reference being had to the accompanying drawings, which form a part of this specification, in which—

Figure I is a side elevation showing the working mechanism of a bicycle embodying the main features of my invention. Fig. II shows a portion of the reverse side of the bicycle, illustrating the application of the brake mechanism to the rear or driving wheel hub of the machine. Fig. III is a detail side view of the brake fixture, to be secured to the rear fork of the frame, and Fig. IV is an edge or end view of the same. Fig. V is a plan view of Fig. I; Fig. VI is a similar view showing an alternative distribution of the driving mechanism; Fig. VII is a side view, partly in section, of the ball-bearing eccentric, used in Fig. VI, and Fig. VIII is an edge view of the same, partly in section. Fig. IX represents one end of the hub of the driving wheel, showing the exterior of the brake mechanism attached thereto; Fig. X is a cross section through the dotted lines *x x*, Fig. IX, and Fig. XI is a side view illustrating the brake clutch, partly in dotted outline. Fig. XII is a vertical, longitudinal section of Fig. IX, Fig. XIII shows the brake clutch center, with its balls or rollers, Fig. XIV is a section through *y y*, Fig. XIII, Fig. XV is a side view showing the brake clutch case with one side open, and Fig. XVI is an exterior edge view of the same inclosed. Fig. XVII shows one end of the driving hub provided with two driving clutches, identical in construction, arranged as in Fig. I, Fig. XVIII is a cross section on the line *z z* Fig. XVII, showing the interior construction of said driving clutch, Fig. XIX is a cross section on the line *x' x'*, Fig. XVIII, and Fig. XX is a similar view showing an increased bearing surface for the balls.

A represents a bicycle having the frame B provided with the cranks C, C' connected by the crank shaft *a* in any usual or suitable manner. The rear or driving wheel D, with its hub H, is also mounted in the frame B as shown. The upper portions of the bicycle frame are omitted for the purpose of illustrating more clearly the working parts.

The frame B is provided with the supplemental ball bearing hanger E, parallel to the usual crank hanger K and conveniently located near the angle formed by the saddle post F and the lower rear fork sides *b b'*, but preferably in the line of said saddle post, and rigidly secured thereto, or forming a part thereof, as shown.

The hub H is provided with the clutches G, G' consisting essentially of the inner hardened ring *c* rigidly secured to the hub H, the outer-ring *d* provided with the inner curving or wedged shaped recesses *d'*, and the balls or rollers *e e* located within said recesses *d'*, between said rings *c* and *d*, and arranged to lock said rings together and to release the same, according to the relative position of said balls within said recesses.

It is evident that when the clutch ring *d* is moved in the direction of the arrow *z'* the balls *e e* are wedged between the fixed inner ring *c* and the outer ring *d*, locking said rings together, and consequently the hub H is thus caused to revolve, that is, the driving wheel D is thus driven forward. It is also evident that when the outer ring *d* is moved in the reverse direction relatively to the hub H the balls *e e* move to the widest ends of the recesses *d' d'*, thus releasing the grip between the said rings *c* and *d* and permitting them to revolve freely with reference to each other. Thus a to and fro movement of the clutch ring *d* alternately clutches and releases the hub H. It will be observed also that when a revolving driving motion has been imparted to the wheel D if the clutch ring *d* be held at rest the hub H will continue to revolve freely within the same, that is the driving wheel is always free to coast forward without interference from the driving clutches.

As shown in Fig. XX the clutch rings *c* and $d$ are provided with grooves $c''$ $d''$ for the balls $e$ thus giving the latter a greater frictional gripping surface.

The working parts of the clutch G are inclosed by side plates $e'$.

The bearing clutch ring $c$ is made separate from the hub H for convenience of hardening and replacing when worn. If the peripheral surface of the hub were suitable, it might be used directly as a bearing surface for the clutch without the intervention of the separate ring $c$.

The crank shaft $a$ is provided with the driving spur gear I which meshes with the pinion $f$, which latter is mounted on the intermediate axle or countershaft $f'$ revolving on ball bearings within the hanger E.

The connecting rod $i$ has one end $h$ pivotally connected to the crank $g$ on the axle $f'$ as shown at $l$, while the opposite end $h'$ is pivotally connected to the projection or lug $k$ of the hub clutch G', as shown at $l'$. In like manner the connecting rod $i'$ (Figs. I and V) has one end pivotally connected to the rod $i$ near the inner end $h$ thereof, as shown at $m$, and its opposite end pivotally connected to the lug $k'$ of the hub clutch G, as shown at $m'$. The clutches G and G' are identical in construction, but, as shown in Figs. I, V, and XVII, one is operated from above and the other from below the hub H.

The operation is as follows: When the gear I is turned forward by the movement of the cranks C C' the pinion $f$, with which it meshes, is revolved in the reverse direction, thus revolving the axle $f'$ with its crank $g$. The revolving of said crank $g$, as is evident, causes reciprocating movement in the driving rods $i$, $i'$. The backward movement of the rod $i$ causes the clutch G' to grip the hub H and to revolve the same, driving the wheel forward, while the simultaneous backward movement of the rod $i'$ releases the hold of the clutch G on the hub and pushes said clutch backward to the position shown in Fig. I ready to take a new grip on said hub. As soon as the crank $g$ passes its center the initial forward movement of the rod $i$ releases the hold of the clutch G' upon the hub H, and at the same instant the clutch G clutches said hub continuing the revolution of the same and the forward movement of the wheel. The clutch G retains its grip on the hub during the forward movement of the rod $i'$, that is, throughout the forward half revolution of the crank $g$ while during the same space the grip of the clutch G' is released from said hub. In like manner the grip of the clutch G is released from the hub while the clutch G' clutches and retains its grip upon said hub, throughout the backward half revolution of said crank $g$. Thus the alternate clutching and releasing of the hub and reciprocating movement of said clutches G G' thereon produce a continuous forward movement of the driving wheel. It will be understood that when the driving wheel is in motion the stopping or slowing up of the driving mechanism will allow the wheel to coast at full speed, the hub turning freely within the clutches G G' which act upon the hub only in one direction and then only when the hub has a tendency to lag behind the driving mechanism. Since the driving wheel is thus free to coast it is necessary to provide means for controlling and stopping it. I therefore provide an automatic brake applied to the hub and operated by back pedaling, as will be understood from the following specific description.

L is a barrel or drum secured to the hub H and revolving therewith. The fixture $n$ is removably secured to the frame, being held in place by its projection $n'$ engaging the jaws $o$ of the rear forks $o'$ and by the wheel axle $p$ passing through the orifice $p'$ of said fixture $n$.

One end of the expanding ring or device $q$ engages or abuts against the outer end, or a shoulder $n''$ of the fixture $n$, while the lug $r$ is secured to, or engages, the opposite end of said expanding ring $q$. The latter, together with a portion of the fixture $n$, is inclosed within the said barrel or drum L, said expanding ring being normally located in close proximity to the inner peripheral surface of the barrel L, as illustrated, especially in Figs. X and XII.

The brake clutch N has its clutch center $s$ provided with grooves or recesses $s'$ for the balls or rollers $t$, and is mounted rigidly on the axle $f'$, and, with its balls $t$, is inclosed peripherally by the clutch ring M, as shown. The clutch ring M is provided with the lug $t'$, and the lugs $r$ of the brake and $t'$ of the brake clutch mechanism are coupled together by the connecting rod $u$ which has its opposite ends pivotally connected to said lugs as shown at $r''$, $t'''$.

The operation is as follows: When the wheel and the driving cranks C C' are moving forward the pinion $f$ with its axle $f'$ and the brake clutch center $s$, secured to said axle, are revolving in the reverse direction, that is, in the direction of the arrow $v'$, Fig. XI. It is evident therefore that when the clutch center $s$ is revolving in the direction described, the balls or rollers $t$ are necessarily in the widest part of the recesses $s'$ and are pushed backward by the square or abrupt shoulders $t''$ of the clutch center $s$, and said clutch center $s$ revolves freely within the ring or case M without operating or affecting the brake. When, however, back pressure is applied to the driving cranks the axle $f'$ and clutch center $s$ are of course revolved in the opposite direction, forcing the balls $t$ into narrower portions of the recesses $s'$ thus locking the clutch center s and clutch ring M firmly together. The clutch ring M, thus locked, is carried forward with the clutch center s, at the same time carrying forward the connecting rod u and thus expanding the ring q and causing it to exert a braking frictional pressure against the inner periphery of the barrel or drum L.

It is evident that by regulating the back pressure on the pedals the braking pressure exerted by the brake mechanism can be regulated perfectly, and this brake may be operated with equal facility by a child or by a heavy man without any differential adjustment of the mechanism. Furthermore, as the leverage applied to the braking shaft f' is multiplied it is evident that, however fast the wheel may be traveling, as great braking pressure may be instantly applied, if desired, for stopping the wheel as is applied for driving the same.

The open face of the brake L is inclosed by the cap u' when said brake is in position, and, in like manner, the face of the clutch N is covered by the cap or case u''.

As shown in Fig. VI the clutch G, with its connecting rod i', is transferred to the opposite side of the machine from that shown in Fig. I. In this case the connecting rod i' is secured to the eccentric P mounted on the countershaft or axle f'. For the purpose of diminishing friction I prefer to make this eccentric P of a circumferentially grooved center v and the case v' with the balls w between them, thus forming a ball bearing eccentric.

In the arrangement shown in Fig. VI the connecting rod i is connected to the lug k of the clutch G' above the hub H, and the crank g and the eccentric P are mounted on the axle f' with their longitudinal centers preferably in the same plane but on opposite sides of their axle f'. Thus the wheel D is driven by the alternate pulling movement of the connecting rods i i' upon their respective hub clutches G' G. This arrangement of connecting rods and clutches has the advantage that both of the connecting rods are located entirely above the rear fork sides b b', that both the driving clutches are located at equal distances from the center of the hub H and both of said connecting rods i i' do their work by pulling. On the other hand the eccentric construction described renders the driving mechanism perhaps somewhat more complicated than that illustrated in Fig. I. When thought desirable, however, the driving hub may be provided with three or four driving clutches, two as shown in Fig. I and one or two on the opposite side of the machine connected to and operated by the eccentric P. In this way a uniform driving pressure may be applied to both ends of the driving hub simultaneously; or by "quartering" the crank and eccentric one clutch may be made to begin its work at the moment one on the opposite side has reached its maximum leverage and efficiency.

The clutches G G' are held in proper position on the hub H by the shoulder a'' and the washers or nuts b''.

The brake mechanism shown in Figs. X and XII is intended to illustrate a convenient device to be used in carrying out my invention, but I do not intend to limit myself to this particular form of brake, but may use other forms. In like manner I may use other forms of driving and brake clutches without interfering with the spirit of my invention.

It will be observed that in the hub clutch G the inner, annular ball seat c, that is, the revolving part of the clutch, is plain or regular in form, while the outer or driving part d of said clutch, is provided with ball or roller retaining recesses d'. On the contrary, in the brake operating clutch N the inner or revolving part s is provided with the ball-retaining recesses s', while the outer ring or case M has a plain or regular inner peripheral surface. That is, in each instance, the driving or power-transmitting part of the clutch is the part provided with the ball or roller retaining recesses.

It will be observed that when the crank gear is turned backward, in back pedaling, the gear meshing therewith is rotated forward, locking the braking clutch and drawing the brake rod forward as heretofore set forth. The forward movement of said rod draws the free end of the split brake ring forward as shown, whereby the pressure on the free end of said brake ring, in applying the brake, is exerted in a direction coinciding with the direction of forward rotation of the wheel. By this construction and arrangement the forward rotation of the wheel is caused to enhance the braking pressure of the brake applied thereto, since said forward rotation of the wheel tends to press the braking element forward against an unyielding fixture.

Having thus described my invention, what I claim as new and desire to secure by Letters Patent, is—

1. In a hub brake, a coasting wheel hub provided on its inner periphery with a braking surface, a non-rotatable fixture supported at one point by the stationary axle and provided with a projection for connection with the frame of the vehicle at a distance from said axle, a movable braking element held in non-rotatable position by said fixture, driving means, and means for forcing the outer surface of said movable element against said braking surface of the hub on reversing the movement of said driving means.

2. The combination of a stationary supporting shaft, a driving and coasting wheel hub rotatably supported thereon and provided with a driver, and on its interior with a braking surface, means for automatically clutching together said driver and hub for driving and releasing the same for coasting, a driving or crank shaft, a stationary fixture supported at one point by said supporting shaft and having an extension engaging the vehicle frame at a distance from said supporting shaft, a non-rotatable movable braking element held in position by said stationary fixture, said braking element coöperating with said braking surface to apply a brake thereto, and means for actuating said brake by the reverse movement of said driving or crank shaft.

3. In a hub brake, a coasting wheel hub provided on its interior with a braking surface, a stationary anchoring plate supported at one point by the wheel axle and arranged for connection with the frame of the vehicle at a distance from said axle, a movable braking element held in non-rotatable position by said anchoring plate, driving means, and means actuated by reversing said driving means, for forcing said movable braking element outwardly against said braking surface of the hub by pressure exerted upon said movable braking element in the direction of the forward rotation of said hub.

4. In a hub brake, a coasting wheel hub provided on its interior with a braking surface, a stationary fixture supported at one point by the wheel axle and engaging the frame of the vehicle at a distance therefrom, a movable braking element connected non-rotatably to said stationary fixture, a driving crank shaft, means for connecting said crank shaft to said hub for driving and disconnecting the same for coasting, means for pressing said movable braking element outwardly against said braking surface of the hub by the reverse movement of said crank shaft, and means for causing the direction of said pressure to coincide with the direction of the forward rotation of said wheel hub.

5. The combination of a stationary supporting shaft, a coasting wheel hub revolubly supported thereon and provided with an inner peripheral braking surface, a braking device embodying a spring braking member radially expansible and applicable to said braking surface of the hub, and means for supporting said spring braking member in non-rotatable position, driving means, means for expanding said spring braking member outwardly into braking contact with said braking surface of the hub on the reverse movement of said driving means, the contractile force of said spring braking member releasing said brake mechanism on the forward movement of said driving means.

6. A self-contained coaster-brake, comprising a rotary wheel hub, a braking surface thereon, a continuous stationary axle passing through said hub and projecting therefrom at each end, a brake-holder on the axle having means to engage a vehicle frame adjacent to the axle to prevent rotation of the brake-holder, a brake connected with the brake-holder and adapted to coöperate with said hub braking surface, a driver having rotary motion about the axis of said hub, and a releasable driving connection between the driver and the hub.

7. A self-contained coaster-brake, comprising a continuous stationary axle adapted to be fixed to the rear frame of a bicycle or similar vehicle, a rotary wheel hub mounted on the axle, a braking surface carried by said hub within such rear frame, a brake-holder on the axle independent of the frame of a vehicle, having means to engage such vehicle frame adjacent to the axle to prevent rotation of said brake-holder, a movable brake connected with the brake-holder and adapted to coöperate with said hub braking surface, a driver having rotative motion about the axis of said hub, and a releasable forward drive connection between the driver and the hub.

8. A self-contained coaster-brake, comprising a rotary wheel hub, a braking surface thereon, a continuous stationary axle passing through said hub and projecting therefrom at each end, a brake-holder on the axle having means to engage a vehicle frame adjacent to the axle to prevent rotation of the brake-holder, a band-brake adapted to coöperate with said braking surface and having one end connected with said brake-holder, a driver having rotative motion about the axis of said hub, and a releasable forward-driving connection between the driver and the hub.

9. Coaster-brake mechanism, comprising a rotary wheel hub, a braking surface thereon, a continuous stationary axle passing through said hub and projecting therefrom at the ends, a brake-holder on the axle having means to engage a vehicle frame to prevent rotation of the brake-holder, a brake connected with the brake-holder and adapted to coöperate with said hub-braking surface, driving means, a releasable driving connection between said driving means and the hub, and means actuated by reverse movement of the driving means for applying the brake.

10. In a bicycle, in combination, a coasting wheel hub having an inner braking surface, a stationary braking element, a movable braking element radially extensible against said braking surface of the hub and retained in non-rotatable position by said stationary element, driving means embodying a driving or crank shaft, means for actuating said brake mechanism on reversing the movement of said driving means, and means intermediate said driving means and said movable braking element to convert the backward pressure of said driving means into forward outward pressure when exerted upon said radially extensible braking element, in applying the brake.

11. In a bicycle a wheel hub having a braking surface at one side of its center, a driver at the opposite side of its center, a brake coöperating with said braking surface, a pivoted brake operating member angularly movable about its center in the direction of forward rotation of the wheel to apply the brake, a drive shaft and connections whereby pressure on the drive shaft in one direction rotates the wheel forwardly and means whereby back pedaling applies the brake.

WILLIAM ROBINSON.

Witnesses:
   FRANCIS E. SMITH,
   CHAS. F. A. SMITH.

Copies of this patent may be obtained for five cents each, by addressing the "Commissioner of Patents, Washington, D. C."